(12) United States Patent
Yun

(10) Patent No.: US 8,626,437 B2
(45) Date of Patent: Jan. 7, 2014

(54) SELECTING ROUTE ACCORDING TO TRAFFIC INFORMATION

(75) Inventor: Kyungso Yun, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1052 days.

(21) Appl. No.: 12/040,625

(22) Filed: Feb. 29, 2008

(65) Prior Publication Data

US 2008/0275629 A1    Nov. 6, 2008

Related U.S. Application Data

(60) Provisional application No. 60/915,466, filed on May 2, 2007.

(30) Foreign Application Priority Data

Jul. 2, 2007    (KR) .................. 10-2007-0066116
Jul. 5, 2007    (KR) .................. 10-2007-0067436

(51) Int. Cl.
*G01C 22/00*    (2006.01)
(52) U.S. Cl.
USPC ........................................ 701/410; 701/423
(58) Field of Classification Search
USPC .................... 701/118, 25, 209, 410, 423
See application file for complete search history.

(56) References Cited

U.S. PATENT DOCUMENTS

| | | | |
|---|---|---|---|
| 7,739,029 B2* | 6/2010 | Ishikawa et al. | 701/117 |
| 7,881,863 B2* | 2/2011 | Uyeki et al. | 701/210 |
| 2004/0172192 A1* | 9/2004 | Knutson | 701/208 |
| 2004/0225437 A1* | 11/2004 | Endo et al. | 701/209 |
| 2005/0273250 A1* | 12/2005 | Hamilton et al. | 701/200 |
| 2006/0089787 A1 | 4/2006 | Burr et al. | |
| 2007/0106465 A1* | 5/2007 | Adam et al. | 701/209 |
| 2008/0125958 A1* | 5/2008 | Boss et al. | 701/123 |
| 2008/0133120 A1* | 6/2008 | Romanick | 701/123 |

FOREIGN PATENT DOCUMENTS

| | | |
|---|---|---|
| EP | 1 600 910 A2 | 11/2005 |
| KR | 1999-0068262 B1 | 9/1999 |
| KR | 2003-0022161 A | 3/2003 |
| KR | 2003-0041157 A | 5/2003 |
| KR | 10-2004-0042216 A | 5/2004 |
| KR | 2004-0050459 A | 6/2004 |
| WO | 2006/123888 A1 | 11/2006 |
| WO | 2007/042796 A1 | 4/2007 |

* cited by examiner

*Primary Examiner* — Mark Hellner
(74) *Attorney, Agent, or Firm* — Birch, Stewart, Kolasch & Birch, LLP

(57) ABSTRACT

A method and apparatus for selecting a travel route in which first and second positions values for searching a travel route are received, and travel prediction information of all road sections from a first position to a second position are calculated by applying a pre-set weight value to each road section according to at least one of current traffic congestion status information and predicted traffic congestion status information from the first position to the second position that correspond to the first and second position values.

22 Claims, 10 Drawing Sheets

FIG. 2
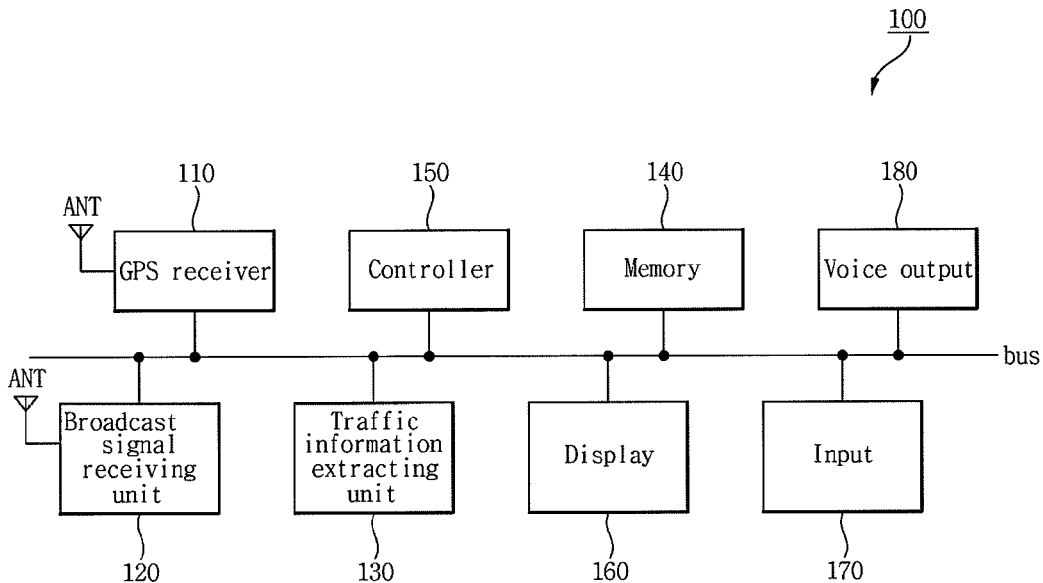
FIG. 3
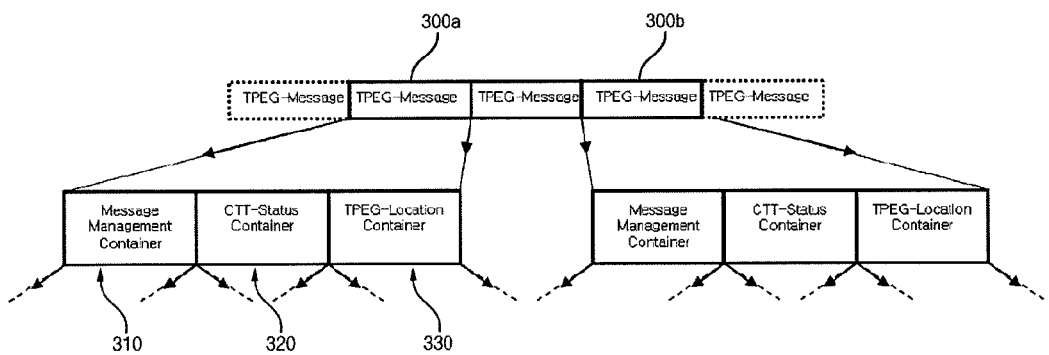
FIG. 4
```
<ctt_component(80)>:=        : Congestion and Travel-Time (CTT) status
<intunti>(id),               : Identifier, id=80 hex
<intunli>(n),                : length of component data by byte(n)
m*<status_component()>;      : Status component
```
                                                                                                    4c 4b 4a

FIG. 5

| | |
|---|---|
| <ctt_component(00)>:= | : Average link speed |
| <intunti>(id), | : Identifier, id=00 hex |
| <intunti>(n), | : length of component data by byte(n) |
| <intunti> | : Speed(Km/h) |

FIG. 6

| | |
|---|---|
| <ctt_component(01)>:= | : Link travel time |
| <intunti>(id), | : Identifier, id=01 hex |
| <intunti>(n), | : length of component data by byte(n) |
| <intunli> | : Time(sec.) |

FIG. 7

| | |
|---|---|
| <ctt_component(02)>:= | : Link delay |
| <intunti>(id), | : Identifier, id=02 hex |
| <intunti>(n), | : length of component data by byte(n) |
| <intunli> | : Time(sec.) |

FIG. 8

| | |
|---|---|
| <ctt_component(03)>:= | : Congestion type |
| <intunti>(id), | : Identifier, id=03 hex |
| <intunti>(n), | : length of component data by byte(n) |
| <ctt03>; | : Congestion type |

FIG. 9

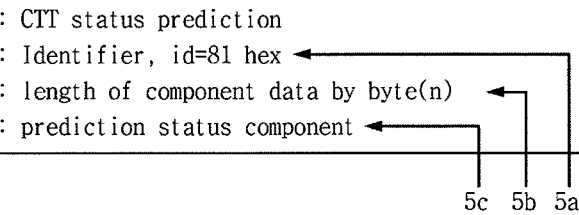

| | |
|---|---|
| <ctt_component(81)>:= | : CTT status prediction |
| <intunti>(id), | : Identifier, id=81 hex |
| <intunli>(n), | : length of component data by byte(n) |
| m*<prediction_status_component()>; | : prediction status component |

| | |
|---|---|
| <prediction_status_component(00)>; | : Average link speed prediction |
| <intunti>(id), | : Identifier, id=00 hex |
| <intunli>(n), | : length of component data by byte(n) |
| <intunti>, | : Speed(Km/h) |
| <intunlo>; | : Prediction time |

FIG. 11

| | |
|---|---|
| <prediction_status_component(01)>; | : Link travel time prediction |
| <intunti>(id), | : Identifier, id=01 hex |
| <intunti>(n), | : length of component data by byte(n) |
| <intunli>, | : Time(sec.) |
| <intunlo>; | : Prediction time |

FIG. 12

| | |
|---|---|
| <prediction_status_component(02)>; | : Congestion tendency |
| <intunti>(id), | : Identifier, id=02 hex |
| <intunli>(n), | : length of component data by byte(n) |
| <ctt04>; | : Congestion tendency |

FIG. 13

| | |
|---|---|
| <ctt_component(8A)>:= | : Additional information |
| <intunti>(id), | : Identifier, id=8A hex |
| <intunli>(n), | : length of component data by byte(n) |
| <ctt41>, | : Language code |
| <short_string>; | : Additional information |

FIG. 16

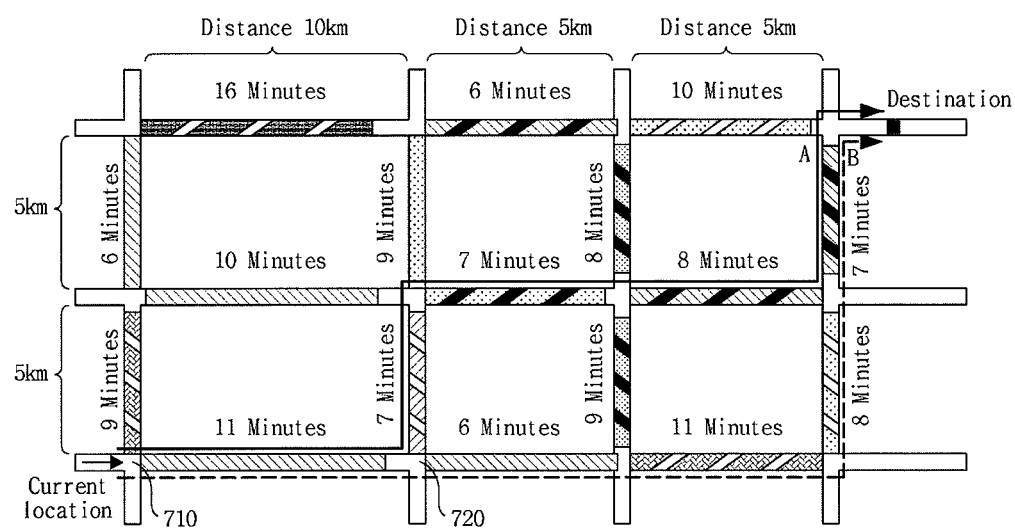

| Pattern | Description | Pattern | Description | Pattern | Description |
|---|---|---|---|---|---|
| ▬▬▬ | Black congestion constant | ▨▨▨ | Black with white stripes congestion reduced | ▨▨▨ | Black with black stripes congestion increased |
| ▨▨▨ | Red delay constant | ▨▨▨ | Red with white stripes delay reduced | ▨▨▨ | Red with black stripes delay increased |
| ░░░ | Yellow slow speed constant | ▨▨▨ | Yellow with white stripes slow speed reduced | ▨▨▨ | Yellow with black stripes slow speed increased |
| ▨▨▨ | Blue smooth constant | ▨▨▨ | Blue with white stripes smooth reduced | ▨▨▨ | Blue with black stripes smooth increased |

FIG. 17

| Weight value according to congestion tendency | Reduced | -10초/Km |
|---|---|---|
| | Constant | 0 Sec/Km |
| | Increased | +10 Sec/Km |

| Weight value according to congestion tendency | Reduced | +2Km/h |
| --- | --- | --- |
| | Constant | 0Km/h |
| | Increased | -2Km/h |

| Delay, congestion tendency | Weight value | Delay, congestion tendency | Weight value | Delay, congestion tendency | Weight value |
|---|---|---|---|---|---|
| Smooth, reduced | 1 | Smooth, constant | 2 | Smooth, increased | 3 |
| Slow speed, reduced | 4 | Slow speed, constant | 5 | Slow speed, increased | 6 |
| Delay, reduced | 7 | Delay, constant | 8 | Delay, increased | 9 |
| Congestion, reduced | 10 | Congestion, constant | 11 | Congestion, increased | 12 |

SELECTING ROUTE ACCORDING TO TRAFFIC INFORMATION

This non-provisional application claims priority to Korean Patent Applications No. 10-2007-0066116, filed on Jul. 2, 2007, and No. 10-2007-0067436, filed on Jul. 5, 2007, and the benefit of U.S. Provisional Application No. 60/915,466 filed May 2, 2007, the entire contents of which are hereby incorporated by reference.

BACKGROUND OF THE INVENTION

1. Field of the Invention

The present invention relates to selecting an optimal travel route.

2. Discussion of the Related Art

Many vehicles now include navigation systems that help the driver get to a desired destination. In more detail, the navigation system includes a Global Positioning System (GPS) receiver that receives a navigation message transmitted from a GPS satellite, and a sensor such as a gyroscope and speed sensor to detect a travel status of the moving vehicle. The navigation system installed in the vehicle also determines a current location of the traveling moving vehicle through a dead-reckoning process that uses the navigation message received by the GPS receiver and a travel status detect signal of the moving vehicle detected by the sensors. The current location of the moving vehicle is then matched and displayed together with map data on a display screen of the navigation system.

Thus, the user of the moving vehicle may check the current location of the moving vehicle and the shortest route from the current location to a destination using the navigation system. The user can also previously map out a route to travel under the guidance of the navigation system.

However, the related art navigation system selects a travel route only using traffic information based on a current time, and thus does not reflect a current road network and flow status.

SUMMARY OF THE INVENTION

Accordingly, one object of the present invention is to address the above-noted and other problems.

Another object of the present invention is to provide a method and terminal that utilizes predicted information about a road traffic flow status.

To achieve these and other advantages and in accordance with the purpose of the present invention, as embodied and broadly described herein, the present invention provides in one aspect a method of selecting a travel route. The method includes receiving message information that includes traffic information, determining whether the message information includes message management information including time information for message management, status information indicating current traffic congestion status information or predicted traffic congestion status information, and location information including link identifiers assigned to road sections each indicating a location corresponding to the current traffic congestion status information or the predicted traffic congestion status information, receiving first and second location values for searching the travel route, and calculating travel prediction information of all road sections from a first position to a second position by applying each weight value previously set for each road section according to at least one of the current traffic congestion status information and the predicted traffic congestion status information from the first position to the second position that correspond to the first and second position values.

In another aspect, the present invention provides an apparatus for selecting a travel route. The apparatus includes a receiving device configured to receive message information including traffic information, a traffic information extracting unit configured to determine whether the message information includes message management information including time information for message management, status information indicating current traffic congestion status information or predicted traffic congestion status information, and location information including link identifiers assigned to road sections each indicating a location corresponding to the current traffic congestion status information or the predicted traffic congestion status information, and to extract the current traffic congestion status information or the predicted traffic congestion status information, an input unit configured to receive first and second location values for searching the travel route, and a processing device configured to calculate travel prediction information of all road sections from a first position to a second position by applying each weight value previously set for each road section according to at least one of the current traffic congestion status information and the predicted traffic congestion status information from the first position to the second position that correspond to the first and second position values.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 2 is a block diagram illustrating a traffic information receiving terminal according to an embodiment of the present invention;

FIG. 3 is an overview illustrating a format for providing wirelessly transmitted CTT (Congestion and Travel-Time information);

FIG. 4 is an overview illustrating a structure of a CTT status component that includes current traffic flow status information;

FIG. 5 is an overview illustrating a format for the CTT component that includes an average link speed;

FIG. 6 is an overview illustrating a format for the CTT component that includes a link travel time;

FIG. 7 is an overview illustrating a format for the CTT component that includes a link delay;

FIG. 8 is an overview illustrating a format for the CTT component that includes a congestion type;

FIG. 9 is an overview illustrating a format for the CTT status component that includes predicted traffic flow status information;

FIG. 10 is an overview illustrating a format for the CTT component that includes an average link speed prediction;

FIG. 11 is an overview illustrating a format for the CTT component that includes a link travel time prediction;

FIG. 12 is an overview illustrating a format for the CTT component that includes a congestion tendency;

FIG. 13 is an overview illustrating a format for the CTT component that includes additional information;

FIG. 16 is an overview of a map display displaying travel routes with travel information according to an embodiment of the present invention;

FIG. 17 is an overview of a table including weight values applied to road links according to an embodiment of the present invention;

DETAILED DESCRIPTION OF THE INVENTION

Reference will now be made in detail to the preferred embodiments of the present invention, examples of which are illustrated in the accompanying drawings.

A navigation system installed in a vehicle according to embodiments of the present invention interfaces with a traffic information providing server and/or a broadcast station that collects and provides traffic information. The traffic information is broadcast according to the TPEG (Transport Protocol Expert Group) standards and the DMB (Digital Multimedia Broadcast) transport standards. Other broadcast or transmission standards may also be used.

Figure 1:
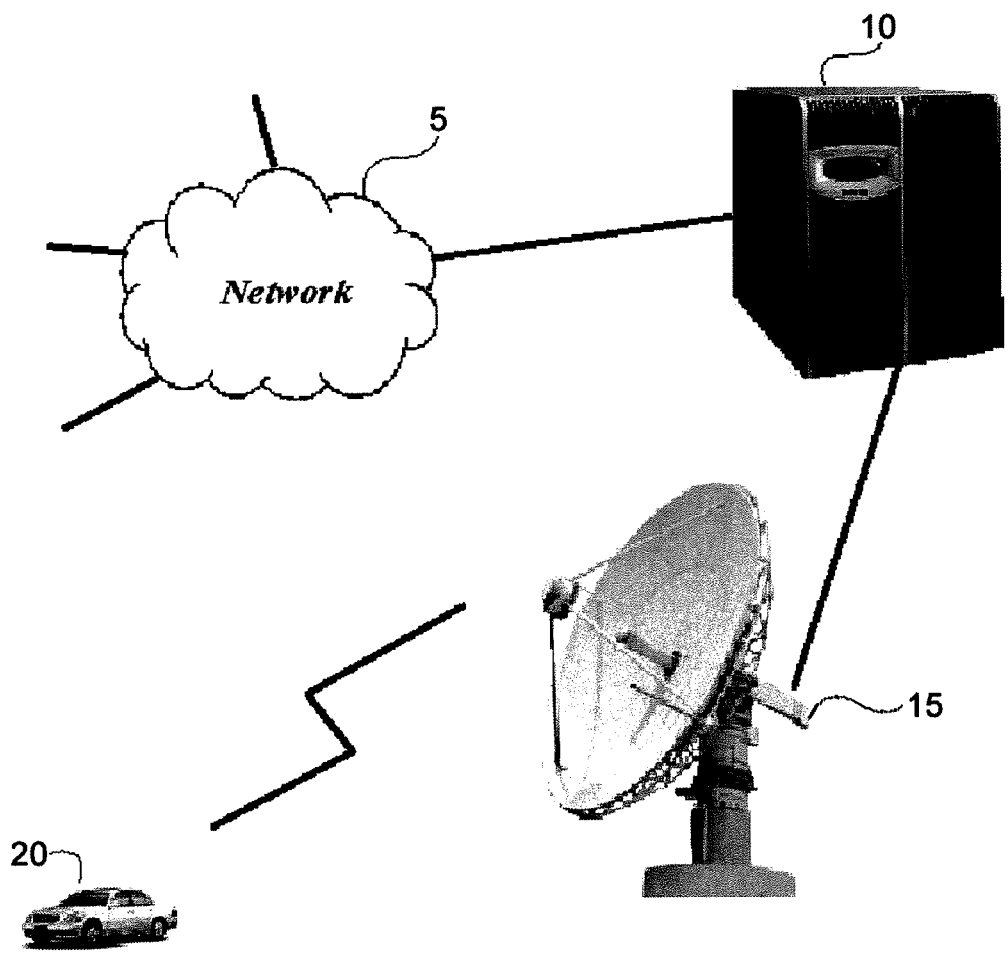
FIG. 1 is an overview illustrating a traffic information providing system according to an embodiment of the present invention.

FIG. 1 is an overview illustrating a traffic information providing system according to an embodiment of the present invention. As shown, the traffic information providing system includes a network 5, a traffic information providing server 10, a broadcast station 15 and a vehicle 20. The network 5 includes a wired/wireless communication network such as a local area network (LAN) or a wide area network (WAN), etc.

In addition, various traffic information are collected through the network 5, and the collected traffic information are processed by the traffic information providing server 10 and then transmitted to the broadcast station 15. Then, the broadcast station 15 inserts the processed traffic information into a broadcast signal and broadcasts the signal to the vehicle 20.

Further, the traffic information providing server 10 re-configures various traffic information collected from diverse sources (e.g., an operator input, the wired/wireless Internet, a transparent data channel (TDC), a digital broadcast service such as a multimedia object transport (MOT), a different server or a probe car, etc.) into a traffic information format such as a format according to the TPEG standard, namely, a standard for a traffic information service, and transmits the information to the broadcast station 15.

The broadcast station 15 inserts the traffic information in a broadcast signal and wirelessly transmits the broadcast signal to an information reception terminal (i.e., navigation terminal) installed in the vehicle 20. The TPEG format will be described in more detail later.

Further, the traffic information includes information about various traffic conditions used when navigating roads, the ocean, air space, etc. The traffic information includes information about an accident, a road situation, a traffic congestion, a road construction, a road closure, a public traffic network delay, an aviation operation delay, etc.

In addition, the broadcast station 15 receives the processed traffic information from the traffic information providing server 10 and wirelessly transmits the signal to the vehicle 20 according to various digital broadcast standards. That is, the broadcast standards include diverse digital broadcast standards such as a Europe-bound digital audio broadcasting (DAB) standard based on Eureka-147 (ETSI EN 300 40), a terrestrial digital multimedia broadcasting (T-DMB) or a satellite DMB (S-DMB), a digital video broadcast terrestrial (DVB-T) standard, a digital video broadcasting-handheld (DVB-H) standard, a media forward link only (MFLO) standard, and the like. The broadcast station 15 may also transmit the traffic information via a wired/wireless network such as the wired/wireless Internet.

In addition, the vehicle 20 refers to all types of carriers implemented using a mechanic or electronic devices to move human beings or objects (i.e., articles or items), such as general passenger cars, buses, trains, ships, aircrafts, etc. In the embodiments of the present invention, the traffic information reception terminal is mounted in the passenger car, but the present invention also applies to other types of transporting means.

Also, the vehicle 20 including the traffic information reception terminal receives TPEG data in the TPEG format from the broadcast station 15, processes the received data, and transfers the processed data via graphic, text and/or audio to the user of the vehicle.

Next, FIG. 2 is a block diagram illustrating a traffic information reception terminal 100 according to an embodiment of the present invention. FIG. 1 will also be referred to in this description. The traffic information reception terminal 100 can be an in-dash type terminal or an on-dash type terminal depending on how the terminal is installed in the vehicle.

In more detail, the in-dash type traffic information reception terminal is fixedly inserted in a certain space allocated within a dash board of the vehicle, and the on-dash type traffic information reception terminal is mounted on the dash board or installed on a certain support (cradle) near the dash board in the vehicle. In addition, the on-dash type traffic information reception terminal is detachable and thus can be separated from the vehicle and carried, and is thus also called a portable navigation device.

Further, the traffic information reception terminal 100 includes all types of information processing devices that can receive and/or process traffic information such as various mobile (portable) terminals that may perform a navigation function by interworking with a GPS receiver that receives a navigation message from a GPS satellite within the vehicle.

As shown in FIG. 2, the traffic information reception terminal 100 includes a GPS receiver 110, a broadcast signal receiver 120, a traffic information extracting unit 130, a memory 140, a controller 150, a display 160, an input unit 170 and a voice output unit 180. The GPS receiver 110 receives a navigation message transmitted from the GPS satellite via an antenna ANT and provides the message to the controller 150. Thus, the traffic information reception terminal 100 can be used to navigate the vehicle 20.

Further, the broadcast signal receiver 120 receives a broadcast signal from the broadcast station 15 via the antenna ANT. The broadcast signal received by the broadcast signal receiver 120 includes traffic information structured according to the TPEG standard and a binary format for scene (BIFS) and additional information such as various supplementary data, as well as video and audio data according to the various standards such as the T-DMB or the S-DMB, the DAB, and the DVB-T or DVB-H, etc., as mentioned above.

In addition, the broadcast signal receiver 120 tunes to a signal band provided by the traffic information, demodulates the tuned signal, and outputs the demodulated signal. The traffic information extracting unit 130 then receives the demodulated signal from the broadcast signal receiver 120, decodes the received signal into a TPEG message sequence configured as shown in FIG. 3, interprets each TPEG message of the sequence, and transfers traffic information and/or a control signal according to the message content to the controller 150.

The controller 150 then stores the received traffic information in the memory 140. Further, the memory 140 includes a non-volatile memory that stores programs and data required for performing various functions provided by the traffic information reception terminal 100 and a volatile memory that temporarily stores various data generated according to an operation of the traffic information reception terminal 100.

In particular, the non-volatile memory of the memory 140 stores various data used for selecting an optimum route to reach a destination. For example, the memory 140 stores congestion traffic information about a road section extracted by the traffic information extracting unit 130 together with a correspondingly determined weight value in the form of a look-up table, for example, such that information can be quickly read and used in the process of searching a travel route for the vehicle.

Further, the memory 140 stores map data required for operating the vehicle 20 based on the navigation message received from the GPS satellite. The map data may include maps expressed with graphs and topographical information, and various geographical data road junctions such as an intersection with a different road or an exit to the different road, a road section connecting respective junctions, and a section distance.

In addition, when the traffic information reception terminal 100 does not store the map data in an electronic map format due to a limited memory capacity, the above-described various geographical data in the form of text, excluding the map shown in graphs, may be stored in the memory 140. Further, the road section includes one or more unit links that are passed to reach the destination, and hereinafter, a road section between two adjacent junctions on the road is defined as a unit link.

In other words, the road section between a start point and the destination may include a set of one or more unit links. The single unit link is the road section between the adjacent junctions, that is, once the vehicle 20 enters the unit link, it cannot go into a different unit link until the next junction appears.

Further, each road section of the map data is identified by a link identifier. For example, the link identifier may include the latitude or the longitude of a start point and an end point of a section, or characters including the title of the section, a number, or a mixture thereof. In addition, the controller 150 may be implemented as a processing device such as a Central Processing Unit (CPU) that processes various data input to the traffic information reception terminal 100, and generally controls the overall operation of the traffic information reception terminal 100.

In particular, the controller 150 searches the map data including various locations such as a current location of the vehicle, and the start point and destination from the memory 140 based on the navigation message received by the GPS receiver 110, searches every possible route to the destination, selects an optimum route using the traffic information extracted by the traffic information extracting unit 130, processes the selected route into a video signal, and outputs the video signal to the display 160.

Further, the display 160 displays the current location of the vehicle, the traffic information and a travel route of the vehicle on the map data read from the memory 140 according to the navigation message received by the GPS receiver 110 under the control of the controller 150. Also, the display 160 may be a liquid crystal display (LCD). The display 160 may also include a touch screen to display various functions of the traffic information reception terminal 100 in a menu structure and also simultaneously performs an input function for executing a menu selected according to a user's touch using a stylus or finger, for example. The touch screen also is used to display information to the user.

The input unit 170 receives various operation commands from the user and applies the input commands to the controller 150. The input unit 170 may be implemented as at least one of a key input unit including at least one number key or function key, a touch pad for inputting information according to a user's touch, and a remote processing device that may be installed on a steering wheel within the vehicle for conveniently operating the traffic information reception terminal 100.

In addition, the voice output unit 180 generates an audio or voice signal to guide the user along a selected route, amplifies the signal to a certain level selected through the input unit 170, and outputs the amplified signal through one or more speakers (not shown) under the control of the controller 150.

Next, FIG. 3 is an overview illustrating a format for providing wirelessly transmitted congestion traffic information. With reference to FIG. 3, the traffic information providing format wirelessly transmitted by the traffic information providing server 10 includes a sequence of message segments (hereinafter referred to as 'TPEG messages').

Also, a single message segment of the sequence of the message segments, namely, a TPEG message 300a may indicate a TPEG-Congestion and Travel-Time information application (TPEG-CTT), and a TPEG message 300b may indicate a TPEG-Road Traffic Message Application or TPEG-Public Transport Information Application that includes accident and unexpected situation information.

Further, a specific identification number called an application identification (AID) is allocated to each TPEG application. The AID is used to decode a received TPEG message using the most suitable application decoder. The TPEG-CTT is allocated an AID 0010 (hex). In addition, the TPEG-CTT provides information mainly to road users (road drivers), and the provided information makes an influence on the use of roads such as flow information in a road network, a delay level, and a travel (passage) time, etc.

In addition, the TPEG message 300a including the Congestion and Travel-Time information Message has a message management container 310, a CTT-status container (application status container) 320, and a TPEG-Location Container 330. In the present embodiment, the CTT-status container 320 of the TPEG message 300a refers to a TPEG-CTT container. The content of the CTT-status container 320 varies depending on a type of the TPEG message application.

Further, the TPEG message 300b for transferring traffic information may be included in the sequence of the TPEG messages, so two or more application can be included in a single TPEG message stream. Also, the message management container 310 includes a message identifier (MID) and a version number (VER). In addition, the message management container 310 may include date and time elements and a message generation time.

Also, the elements of the message management container 310 are used to manage information received from the TPEG decoder. However, with respect to the date and time elements among the elements of the message management container 310, the TPEG-CTT does not transmit a start time, an end time, a message erase time, and schedule information, unlike other applications of the TPEG (the accident and unexpected situation information application and the public transport information application). This is because the transmission of a current flow status with respect to each point is important for the congestion and travel time information, unlike the unexpected situation information that needs to manage a message according to an unexpected or planned situation whose status changes at any moment.

Further, the application status container 320 (i.e., the TPEG-CTT container 320) includes current traffic flow status information and predicted traffic flow status information, etc., of each link (road section) as generated. In addition, the description of the status information in the application status container 320 has a hierarchical structure in order to guarantee terminal compatibility according to expansion of standards and addition of a component.

Next, Table 1 shows a class of the TPEG-CTT container 320.

| Class | Description |
| --- | --- |
| CTT_Status | Describes a traffic flow situation in a traffic network or in an arbitrary road section |
| Prediction_CTT_Status | Describes a predicted traffic flow situation in a traffic network or in an arbitrary road section |
| Additional information | Describes additional information about a traffic flow situation in the form of text |

As shown in Table 1, the TPEG-CTT container 320 includes the CTT status component that transmits current traffic flow status information, the prediction CTT status component that transmits predicted traffic flow status information, and the additional information component including supplementary information or auxiliary information related to the CTT status.

FIGS. 4-13 include examples of information transmitted to the navigation terminal according to embodiments of the present invention and will be described in more detail when referred to in this description. For example, FIG. 4 is an overview illustrating a structure of the CTT status component that includes the current traffic flow status information, which is included in the TPEG-CTT container 322.

As shown in FIG. 4, the CTT status component is allocated an identifier (4a) '80h', includes the m number of status components (4c), and has a field (4b) expressing the overall data length of the included status components in bytes. In addition, each status component of the CTT status component includes the current traffic flow status information, namely, information regarding an average link speed, a travel time, a link delay and a congestion type, etc. in the formats as shown in FIGS. 5 to 8.

Further, in FIG. 5, the average link speed is assigned an identifier '00', and (km/h) is used as the unit of the average link speed. FIG. 6 illustrates a link travel time and is assigned an identifier '01' and (sec) is used as the unit of the travel time. In FIG. 7, the link delay is assigned an identifier '02', and (sec) is used as the unit of the link delay. As shown in FIG. 8, the congestion type is assigned an identifier '03'. Table 2 illustrates an example of the information included for the congestion type.

TABLE 2

| TPEG table CTT information 03 (CTT 03): Congestion level |||| 
| --- | --- | --- | --- |
| Code | Type | Content | Example |
| 0 | Not known | | |
| 1 | Smooth | | |
| 2 | Slow speed | | |
| 3 | Delay | | |
| 4 | Congestion | | |
| ... | End of version 0.9 | | |
| 255 | | | |

Next, FIG. 9 is an overview illustrating a structure of the prediction CTT status component that includes predicted traffic flow status information among the CTT information included in the TPEG-CTT container 320. As shown, the prediction CTT status component that includes predicted information is allocated an identifier (5a) '81h', includes the 'm' number of status components (5c), and has a field (5b) expressing the overall data length of the included status components in bytes.

In addition, as shown in FIGS. 10 to 13, each status component of the prediction CTT status component includes predicted traffic flow status information, namely, a prediction average link speed, a prediction travel time, a congestion tendency, and additional information, respectively.

For example, as shown in FIG. 10, the prediction average link speed is assigned an identifier '00, as shown in FIG. 11, the prediction travel time is assigned an identifier '01, as shown in FIG. 12, the congestion tendency is assigned an identifier '02', and as shown in FIG. 13, the additional information is assigned an identifier '03'.

The below Table 3 shows the TPEG table CTT 04 defined in the TPEG CTT information application standards appendix A (regulations).

TABLE 3

| TPEG table CTT information 03 (CTT 03): Link speed tendency |||| 
| --- | --- | --- | --- |
| Code | Type | Content | Example |
| 0 | Not known | | |
| 1 | Increased | | |
| 2 | Decreased | | |

TABLE 3-continued

TPEG table CTT information 03 (CTT 03): Link speed tendency

| Code | Type | Content | Example |
|---|---|---|---|
| 3 | Constant |  |  |
|  | End of |  |  |
|  | version 0.9 |  |  |
| ... |  |  |  |
| 255 |  |  |  |

Figure 14:
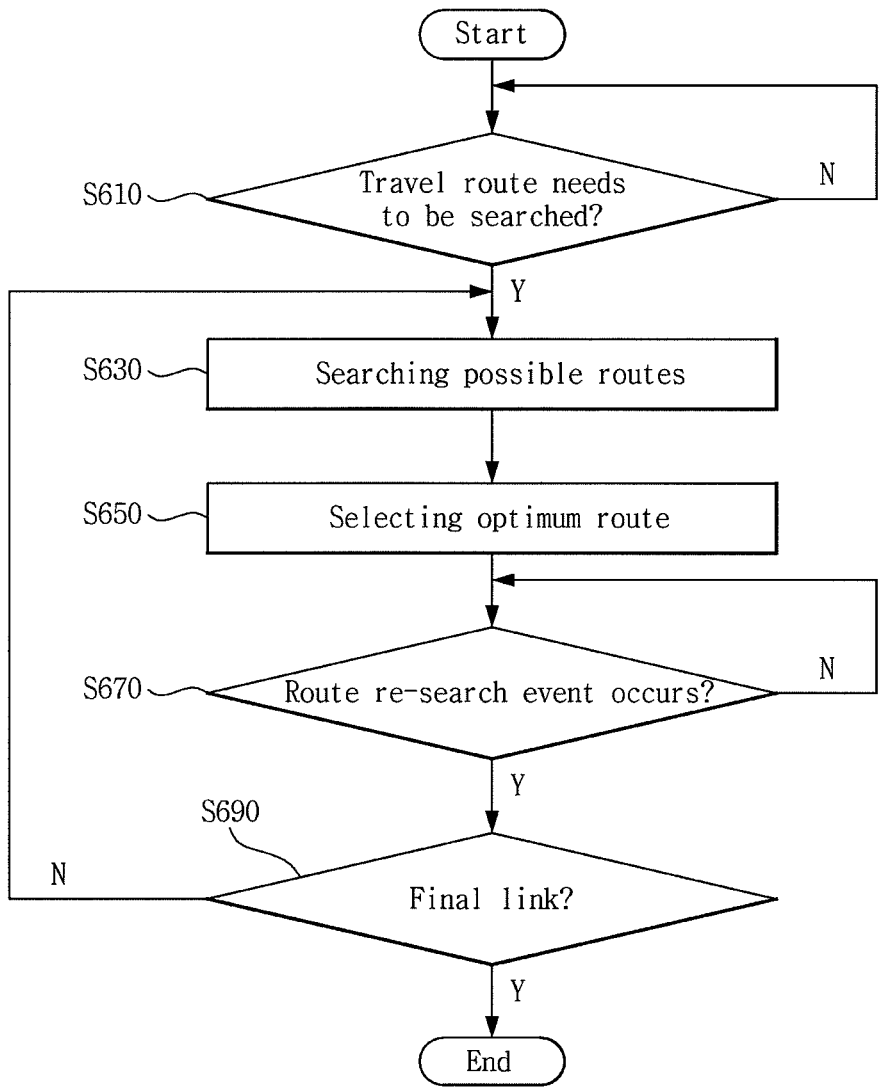
FIG. 14 is a flowchart illustrating a method of selecting a travel route according to an embodiment of the present invention.

Next, FIG. 14 is a flowchart illustrating a method of selecting a travel route according to an embodiment of the present invention. FIGS. 1 and 2 will also be referred to in this description.

With reference to FIG. 14, when the user requests searching for a travel route to a specific destination (Yes in S610), the controller 150 reads the map data stored in the memory 140 and searches every route that leads to the destination from a current location of the vehicle 20 using the navigation message received by the GPS receiver 110 (S630).

The controller 150 then selects an optimum route from the searched routes using the congestion traffic information extracted from the TPEG CTT message by the traffic information extracting unit 130 (S650), and executes a navigation travel guidance. The process of selecting the optimum route in step S650 is illustrated in more detail in FIG. 15.

Figure 15:
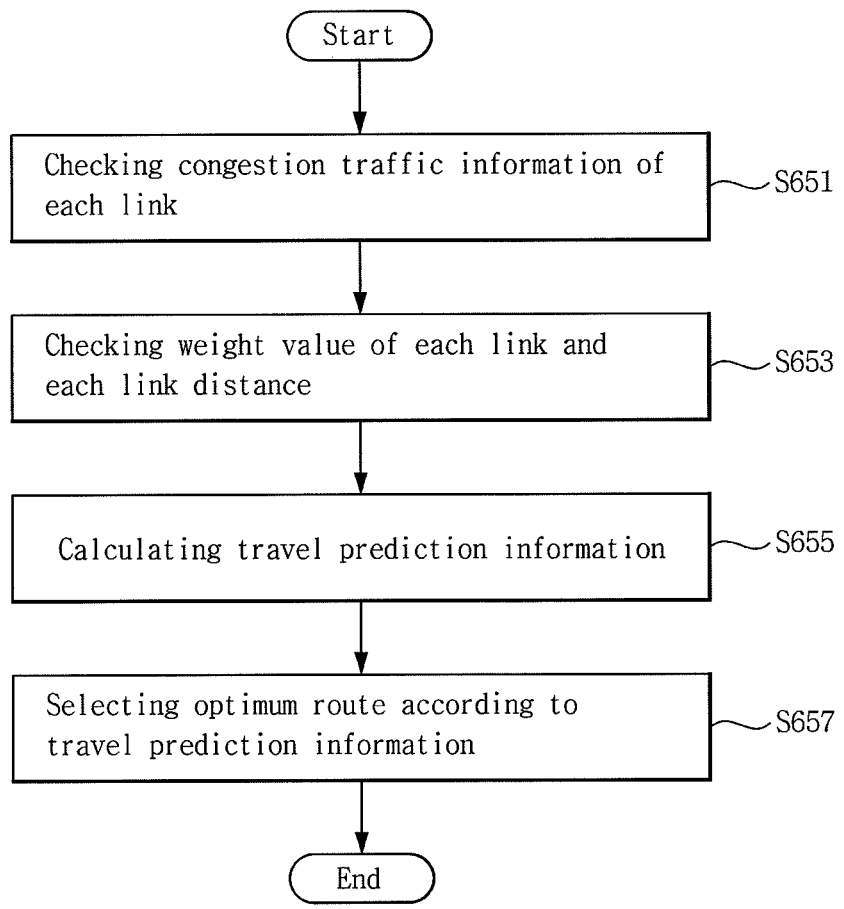
FIG. 15 is a flowchart illustrating a method of selecting an optimum route in step S650 in FIG. 14 according to an embodiment of the present invention.

With reference to FIG. 15, in order to calculate travel prediction information of each searched route, the controller 150 checks congestion traffic information of each unit road section using map data of each route (S651). The congestion traffic information checked by the controller 150 includes the current traffic flow status information, namely, the information regarding an average link speed, a travel time, a link delay and a congestion type, etc., as shown in FIGS. 5 to 8, and predicted traffic flow status information, namely, a prediction average link speed, a prediction travel time, a congestion tendency, and additional information, etc., as shown in FIGS. 10 to 13.

The broadcast signal receiver 120 tunes to a signal band providing the congestion traffic information, demodulates the tuned signal, and transfers the to the traffic information extracting unit 130. Accordingly, the traffic information extracting unit 130 decodes the inputted demodulated signal into a TPEG message sequence, interprets the TPEG-CTT of the TPEG message of the sequence, extracts the congestion traffic information as stated above, and transfers the congestion traffic information to the controller 150.

The processing procedure regarding the congestion traffic information, namely, the current traffic flow status information and the predicted traffic flow status information extracted by the traffic information extracting unit 130 as shown in FIGS. 5 to 8 and 10 to 13 will be described as follows.

That is, the traffic information extracting unit 130 recognizes whether the corresponding TPEG message corresponds to the TPEG congestion traffic information application according to the AID information, and when the TPEG message corresponds to the TPEG congestion traffic information application, the traffic information extracting unit 130 decodes the TPEG message.

Further, the traffic information extracting unit 130 extracts the date/time, a message generation time of the message management container of each TPEG message, and recognizes whether a subsequent container is an application status container, namely, the TPEG-CTT container, from information of the message element.

When the subsequent container is the TPEG-CTT container, the traffic information extracting unit 130 obtains location information corresponding to the congestion traffic information currently transmitted from the subsequent TPET-CTT location container. Further, the location information can be identified by the link identifier as described above, e.g., the link identifier including the location coordinates, namely, the longitude and the latitude, of a start point and an end point of a link, or characters including the title of a link, a number, or a mixture thereof according to the type information of the TPEG-CTT location container.

Thus, the traffic information extracting unit 130 can selectively extract congestion traffic information corresponding to a link of which link prediction information is desired to be calculated according to embodiments of the present invention with reference to a link identifier of the link. Further, the controller 150 checks the congestion traffic information transferred from the traffic information extracting unit 130, checks a weight value according to congestion traffic information of each link by searching a look-up table stored in the memory 140, and checks the distance of each link using the map data (S653).

FIG. 17 is an overview illustrating one example of a look-up table with respect to weight values according to the congestion traffic information stored in the memory 140. As shown in FIG. 17, weight values are applied according to the congestion tendency. In more detail, the congestion tendency virtually corresponds to traffic information of a current situation, and because a change in the current traffic situation can be predicted according to the congestion tendency, the congestion tendency can be utilized as prediction information.

Further, the weight values are applied to calculate travel prediction information according to the congestion tendency, but the weight values may also be applied using different congestion traffic information. For example, weight values may be applied according to a link travel time prediction among the predicted traffic flow status information.

According to the look-up table as shown in FIG. 17, a weight value of −10 sec/km is applied when the congestion tendency of a corresponding link is reduced, 0 sec/km is applied when the congestion tendency of the corresponding link is constant, and 10 sec/km is applied when the congestion tendency of the corresponding link is increased. Other units such as miles per hour may also be used.

In addition, because the congestion tendency may be discriminated into a case where an average link speed is maintained, a case in which the average link speed is increased, and a case in which the average link speed is decreased, the traffic status according to the congestion tendency is discriminated by three stages. However, without being limited thereto, each stage of the congestion tendency can be discriminated in more detail, and various different weight values may be applied to each discriminated stage.

Subsequently, and as shown in FIG. 15, the controller 150 calculates travel prediction information by applying the above-mentioned weight values to congestion traffic information of the respective links constituting a corresponding travel route (S655). For example, the travel prediction information may be calculated as a prediction link travel time such that a link distance is multiplied to a weight value of a corresponding link, to which a link travel time is added, and then the resultant values of each link are added.

The method of calculating the travel prediction information according to the above example can be expressed by equation (1) shown below:

$$P = \Sigma(T + a*L) \qquad (1)$$

where 'P' is the travel prediction information, 'T' is the link travel time, 'a' is the weight value, and the 'L' indicates the link distance.

In addition, the controller 150 calculates the travel prediction information for all links of each corresponding route searched as described above, and selects a route in which the travel prediction information has a maximum value or a minimum value as an optimum route (S657) (in this example, a route in which the travel prediction information has the minimum value).

FIG. 16 is an overview illustrating an example of a map of available road sections to reach the destination from the current location of the vehicle. As shown in FIG. 16, the road sections from the current location 710 of the vehicle to the destination on the map are divided into unit links, and each link reflects the corresponding congestion traffic information as described above so as to be discriminated.

Further, as described above, the controller 150 searches every possible route to the destination, calculates the travel prediction information by applying the congestion traffic information to the searched routes, and selects an optimum route. In more detail, and with reference to FIG. 16, as for two routes 'A' and 'B', without applying the weight values, the link travel time of the route 'A' is 40 minutes and that of the route 'B' is 43 minutes. Thus, in this instance, the route 'A' would be selected.

If, however, travel prediction information is calculated by applying the weight value according to the embodiment of the present invention, for the route 'A', the congestion tendency is constant in the first link, among all links, while it is increased in the other remaining links of 20 km. Thus, the weight value 10 sec/km is multiplied to the link distance 20 km, obtaining 200 seconds. When 200 seconds is added to the entire link travel time of the route 'A', the travel prediction information is obtained as 40 minutes+200 seconds, namely, 43 minutes and 20 seconds.

In addition, for the route 'B', because the congestion tendency is reduced in the third and fourth links, the weight value −10 sec/km is multiplied to the total distance 10 km of the two links. Also, because the congestion tendency is increased in the fifth link, the weight value 10 sec/km is multiplied to the link distance 5 km. And then the two values are added (10*(−10)+5*10) to obtain −50 sec. When −50 sec is added to the entire link travel time, the travel prediction information is obtained as 43 minutes-50 seconds', namely, as 42 minutes and 10 seconds.

Accordingly, before the weight values are applied, the route 'A' is selected, but according to the travel prediction information obtained by applying the weight values according to the embodiment of the present invention, the route 'B' is selected as the optimum route.

Further, when there are several routes whose travel prediction information has the minimum value, a route that has links whose congestion tendency is reduced and are relatively long may be selected. For example, on the assumption that the travel prediction information of the routes 'A' and 'B' in FIG. 16 are the same, for the route 'B', the congestion tendency of the third and fourth links is reduced, so the total distance of the links in which the congestion tendency is reduced is relatively long, compared with the route 'A' that does not have a link with a reduced congestion tendency.

Accordingly, the route 'B' can be selected. However, the present invention is not limited to this, and a method in which a route that has links that have the reduced congestion tendency and are closer to the current location of the vehicle than the destination and is longer may be selected.

When the optimum route is selected, the controller 150 executes a travel guidance with the selected optimum route. Further, the controller 150 may check the additional information component as shown in FIG. 13 to display the supplementary information or auxiliary information related to the CTT information in the form of text on the map.

With reference to FIG. 14, the controller 150 starts the travel guidance according to the selected optimum route, and when an event requiring re-searching of the travel route occurs (Yes in S670), the controller 150 checks whether the road section of the current travel corresponds to a final link of the travel route (S690).

In more detail, an event for requesting re-searching of the travel route includes an instance when the vehicle 20 enters a new road section while on the move, or when a new TPEG traffic information message is received so traffic information is updated. Thus, whenever the event for requesting re-searching of the travel route occurs as the vehicle 20 enters a new road section or as the TPEG traffic information is updated, a travel route that may be optimum at a time point when the event occurs is again calculated and the travel route is changed accordingly, whereby a changing traffic situation such as a change in the road situation can be suitably reflected to thus provide an effective travel guidance.

In addition, when a road section to which the vehicle 20 newly enters is a final link of the travel route, the controller 150 may not re-search the travel route until the vehicle 20 reaches the destination after the travel guidance is finished. This is because re-searching of the travel route may be unnecessary when the road section to which the vehicle 20 newly enters is the final road section of the route to the destination.

If, however, a road section to which the vehicle 20 enters is not the final road section of the travel route to the destination (No in S690), this means that the road section in which the vehicle 20 is currently located has been changed, so a travel route re-search event occurs.

In this instance, the controller 150 repeatedly performs the steps S630 and S650 in FIG. 14, namely, the steps S651 to S657 in FIG. 15, with respect to the remaining road sections. That is, all the possible routes up to the destination from the current location of the vehicle are searched, an optimum route of the searched routes is selected, and a navigation travel guidance is executed through the selected optimum route.

In addition, the selecting of the optimum route from the searched routes is the same as described above with reference to FIG. 15. That is, the controller 150 checks traffic information for each road section up to the destination from the location to which the vehicle 20 has been moved, and adds values obtained by multiplying weight values of respective corresponding links to the corresponding link distances with respect to the entire links. Then, the controller 150 selects a route in which the calculated total value is the minimum as an optimum route.

For example, and with reference to FIG. 16, the vehicle 20 passes through a current junction 710 and then passes through a current road section, and when a new road section appears, namely, when the next junction 720 appears, the controller 150 determines that the event for requesting re-searching of the travel route has occurred. In addition, when the currently traveling road section is not a final link, the controller 150 repeatedly performs the steps S630 and S651 to S657 to calculate the optimum route with respect to the remaining road sections, changes the route according to the calculated route, and performs the navigation guidance.

Figures 18, 19:
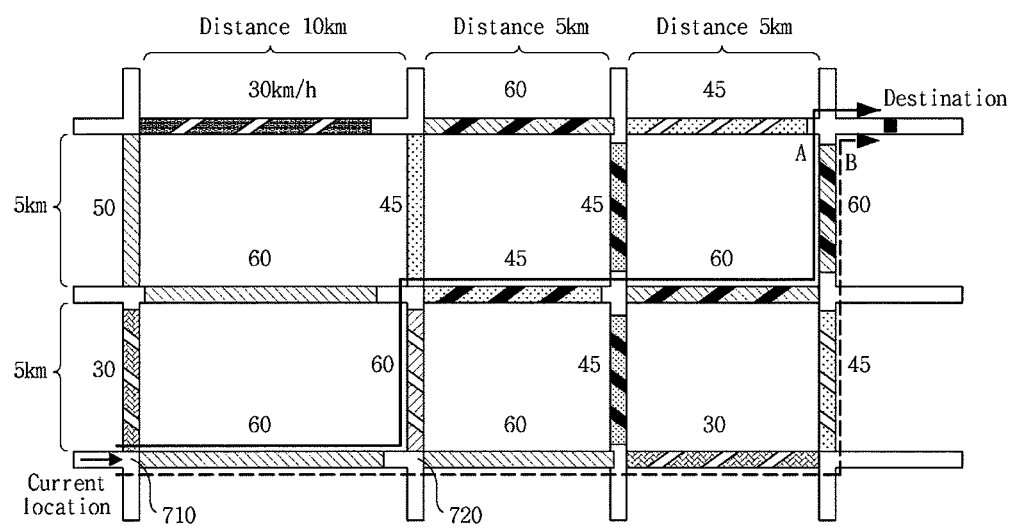
FIG. 18 is an overview of a map display displaying travel routes with travel information according to another embodiment of the present invention.
FIG. 19 is an overview of a table including weight values applied to road links according to another embodiment of the present invention.

Next, FIG. 19 is a view illustrating another example of a look-up table of weight values according to congestion traffic information stored in the memory. With reference to FIG. 19, weight values are applied according to congestion tendency. For example, when congestion tendency of a corresponding link is reduced, a weight value '+2 km/h' may be applied, when the congestion tendency of the corresponding link is constant, '0 km/h' may be applied, and when the congestion tendency of the corresponding link is increased, '−2 km/h' may be applied.

Herein, the weight values are divided into three stages according to the congestion tendency, but the present invention is not limited thereto.

The controller 150 checks current traffic congestion information and predicted traffic congestion information of each unit road section of possible routes searched in step S630 up to a destination using the map data and received congestion traffic information, checks the look-up table as shown in FIG. 19, and applies respective weight values to calculate travel prediction information of each link (S655).

For example, the travel prediction information according to the present exemplary embodiment may be calculated such that a weight value of a corresponding link and a link distance are multiplied, to which an average link speed is added, and the resultant value is divided by the link distance.

The calculation of the travel prediction information in this example can be expressed by equation (2) shown below:

$$P=\Sigma(V+a*L)/L \qquad (2)$$

where 'P' is the travel prediction information, 'V' is the average link speed, 'a' is a weight value, and 'L' indicates the link distance.

Next, FIG. 18 is an overview showing an example of a map of available road sections to reach the destination from the current location of the vehicle according to another embodiment of the present invention. As shown in FIG. 18, the road sections from the current location 710 of the vehicle to the destination on the map are divided into unit links, and each link reflects the corresponding congestion traffic information as described above so as to be discriminated.

In addition, as discussed above, the controller 150 searches every possible route to the destination, calculates the travel prediction information by applying the congestion traffic information to the searched routes, and selects a route of which the travel prediction information has a maximum value as an optimum route or a minimum value (in this example, a route of which the travel prediction information has the maximum value).

With reference to FIG. 18, as for two routes 'A' and 'B', without applying the weight values, the travel prediction information of the route 'A' is calculated such that 60/10+60/5+45/4+60/5+60/5=51 and that of the route 'B' is calculated such that 60/10+60/5+30/5+45/5+60/5=45. Thus, in this instance, the route 'A' would be selected.

However, when the weight values according to this embodiment of the present invention are applied, the travel prediction information of the route 'A' is calculated such that 60/10+(60−2*5)/5+(45−2*5)/5+(60−2*5)/5+(60−2*5)/5=43. That is, the travel prediction information is 43. Also, when the weight values are applied, the travel prediction information of the route 'B' is calculated such that 60/10+60/5+(30+2*5)/5+(45+2*5)/5+(60−2*5)/5=47. That is, the travel prediction information of the route 'B' is 47. Thus, unlike the route 'A' that is selected in the related art, in the present embodiment, the route 'B' is selected as an optimum route.

Figure 20:
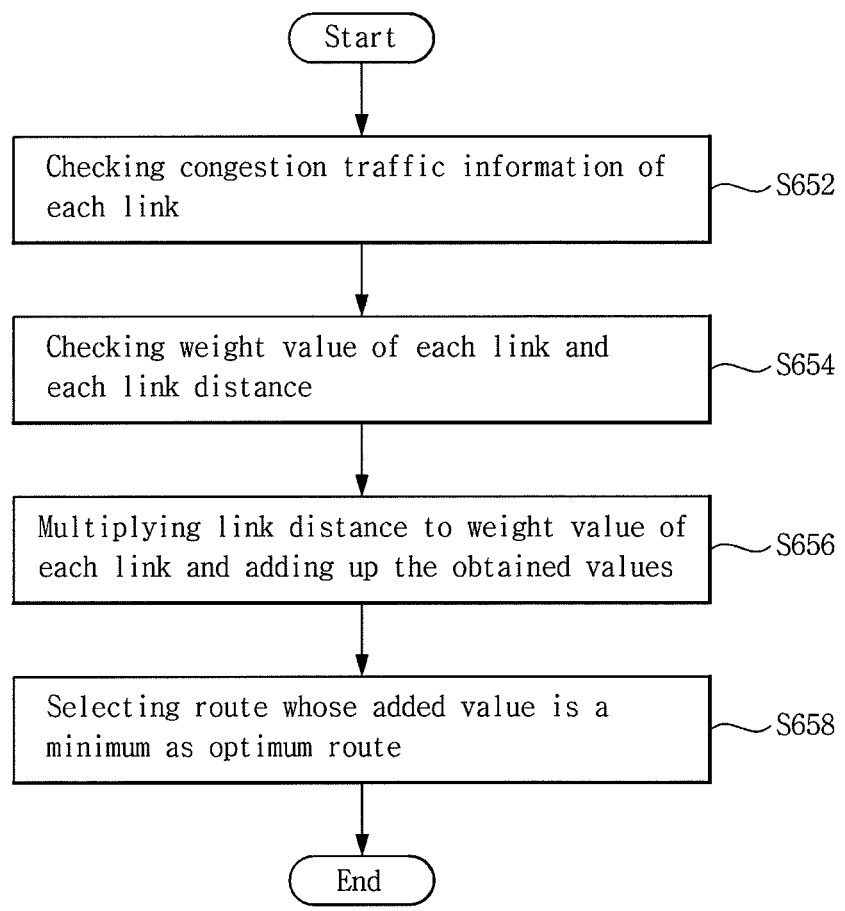
FIG. 20 is a flowchart illustrating a method of selecting an optimum route in step S650 in FIG. 6 according to another embodiment of the present invention.

Next, FIG. 20 is a flowchart illustrating a method for selecting an optimum route in step S650 in FIG. 6 according to another embodiment of the present invention. FIGS. 1 and 2 will also be referred to in this description. With reference to FIG. 20, in order to calculate travel prediction information of each searched route, the controller 150 checks congestion traffic information of each unit road section using map data of each route (S652).

Further, the congestion traffic information checked by the controller 150 includes the current traffic flow status information, namely, the information regarding an average link speed, a travel time, a link delay and a congestion type, etc., as shown in FIGS. 5 to 8, and predicted traffic flow status information, namely, a prediction average link speed, a prediction travel time, a congestion tendency, and additional information, etc., as shown in FIGS. 10 to 13.

In addition, the broadcast signal receiver 120 tunes to a signal band providing the congestion traffic information, demodulates the tuned signal, and transfers the signal to the traffic information extracting unit 130. Then, the traffic information extracting unit 130 decodes the inputted demodulated signal into a TPEG message sequence, interprets the TPEG-CTT of the TPEG message of the sequence, extracts the congestion traffic information as stated above, and transfers the congestion traffic information to the controller 150.

The processing procedure regarding the congestion traffic information, namely, the current traffic flow status information and the predicted traffic flow status information extracted by the traffic information extracting unit 130 as shown in FIGS. 5 to 8 and 10 to 13 will be described as follows.

That is, the traffic information extracting unit 130 recognizes whether the corresponding TPEG message corresponds to the TPEG congestion traffic information application according to the AID information, and when the message corresponds to the TPEG congestion traffic information application, the traffic information extracting unit 130 decodes the TPEG message.

The traffic information extracting unit 130 then extracts the date/time, a message generation time of the message management container of each TPEG message, and recognizes whether a subsequent container is an application status container, namely, the TPEG-CTT container from information of a message element. When the subsequent container is the TPEG-CTT container, the traffic information extracting unit 130 obtains location information corresponding to the congestion traffic information currently transmitted from the subsequent TPET-CTT location container.

Further, the location information can be identified by a link identifier as described above, e.g., the link identifier including the location coordinates, namely, the longitude and the latitude, of a start point and an end point of a link, or characters including the title of a link, a number, or a mixture thereof according to the type information of the TPEG-CTT location container. Thus, the traffic information extracting unit 130 can selectively extract congestion traffic information corresponding to a link of which link prediction information is desired to be calculated according to the embodiment of the present invention with reference to a link identifier of the link.

In addition, the controller 150 checks the congestion traffic information transferred from the traffic information extracting unit 130, checks a weight value according to congestion traffic information of each link by searching a look-up table stored in the memory 140, and checks the distance of each link using the map data (S654).

Figures 21, 22:
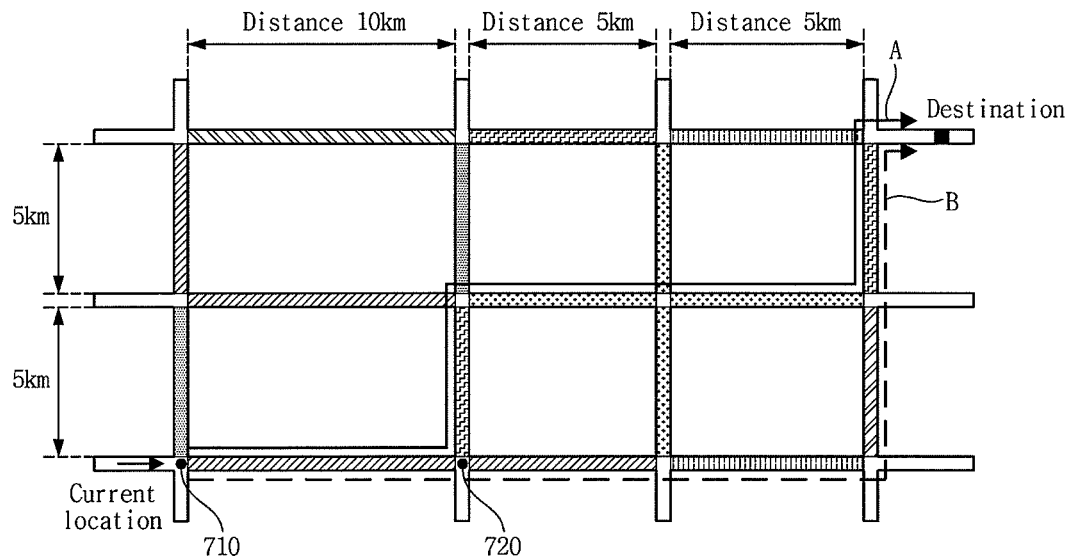
FIG. 21 is an overview of a map display displaying travel routes with travel information according to yet another embodiment of the present invention.
FIG. 22 is an overview of a table including weight values applied to road links according to yet another embodiment of the present invention.

For example, FIG. 22 is an overview illustrating one example of a look-up table. With reference to FIG. 22, weight values are applied according to the congestion tendency. That is, the congestion tendency virtually corresponds to traffic information of a current situation, and because a change in the current traffic situation can be predicted according to the congestion tendency, the congestion tendency can be utilized as prediction information.

Further, the weight values are applied to calculate travel prediction information according to the congestion tendency, but the weight values may also be applied by using different congestion traffic information. For example, weight values may be applied according to the link delay and the congestion tendency among the current traffic flow status information.

Therefore, according to the look-up table as shown in FIG. 22, when a congestion type, e.g., a traffic flow of a corresponding link is smooth and its congestion tendency is reduced (i.e., when a current traffic flow is smooth and congestion is reduced), a weight value 1 is applied. When the congestion type is smooth and its congestion tendency is increased (i.e., when a current traffic flow is smooth but congestion is increased), a weight value 3 is applied.

Further, in this embodiment, the congestion type may be discriminated by four stages of, e.g., 'smooth', 'slow speed', 'delay', and 'congestion', and the congestion tendency may be discriminated by a case where an average link speed is maintained, a case in which the average link speed is increased, and a case in which the average link speed is reduced. Accordingly, the traffic status can be discriminated by 12 stages in consideration of the congestion type and congestion tendency, and each different weight value may be applied to each stage.

Subsequently, the controller 150 calculates travel prediction information by adding values obtained by multiplying a weight value according to a traffic status and a link distance of the entire links constituting a corresponding travel route (S656). In this manner, the controller 150 obtains each addition value (i.e., travel prediction information) with respect to all links of respective searched corresponding routes, and selects a route whose obtained travel prediction information is the minimum as an optimum route (S658).

Next, FIG. 21 is an overview showing an example of a map of available road sections to reach the destination from the current location of the vehicle according to another embodiment of the present invention. As shown in FIG. 21, the road sections from the current location 710 of the vehicle to the destination on the map are divided into unit links, and each link is shown to be discriminated with a mark indicating one of the 12 stages by reflecting the traffic information as described above.

Further, the controller 150 searches every possible route to the destination, and selects a route from the searched routes using the traffic information. In this example, the two routes of 'A' and 'B' show the same travel prediction information. Namely, for the route 'A', the travel prediction information is obtained such that a weight value of each link and each link distance are multiplied and the respective resultant values are added. With reference to FIG. 21, the travel prediction information of the route 'A' is 2*10+3*5+6*5+6*5+3*5=100, and that of the route 'B' is 2*10+2*5+7*5+4*5+3*5=100.

In addition, when there are several routes whose travel prediction information has the minimum value, the route 'B' that has links whose congestion tendency is reduced, namely, in which the distance of the third and fourth links is relatively long, may be selected. However, a method in which a route, which has links that have the reduced congestion tendency and are closer to the current location of the vehicle than the destination, is longer may be selected.

When the optimum route is selected, the controller 150 executes a travel guidance with the selected optimum route. Further, the controller 150 may check the additional information component as shown in FIG. 13 to display the supplementary information or auxiliary information related to the CTT information in the form of text on the map.

In addition, and with reference to FIG. 14, the controller 150 starts the travel guidance according to the selected optimum route, and when an event requiring re-searching of the travel route occurs (Yes in S670), the controller 150 checks whether the road section of the current travel corresponds to a final link of the travel route (S690).

That is, the event for requesting re-searching of the travel route includes when the vehicle 20 passes through a current road section to enter a new road section while on the move, or when a new TPEG traffic information message is received such that the traffic information is updated.

Thus, whenever the event for requesting re-searching of the travel route occurs as the vehicle 20 enters a new road section or as the TPEG traffic information is updated, a travel route that may be optimum at a time point when the event occurs is again calculated and the travel route is changed, whereby a changing traffic situation such as a change in the road situation can be suitably reflected to thus provide an effective travel guidance.

In addition, when a road section to which the vehicle 20 newly enters is a final link of the travel route, the controller 150 may not re-search the travel route until the vehicle 20 reaches the destination after the travel guidance is finished. This is because re-searching of the travel route may be unnecessary when the road section to which the vehicle 20 newly enters is the final road section of the route to the destination.

If, however, a road section to which the vehicle 20 enters is not the final road section of the travel route to the destination (No in S690) means that the road section in which the vehicle 20 is currently located has been changed so a travel route re-search event occurs. Thus, the controller 150 repeatedly performs the steps S630 and S650 in FIG. 14, namely, the steps S651 to S657 in FIG. 20, with respect to the remaining road sections.

That is, all possible routes up to the destination from the current location of the vehicle are searched, an optimum route of the searched routes is selected, and a navigation travel guidance is executed through the selected optimum route.

The selecting of the optimum route from the searched routes is the same as described above with reference to FIG. 20. That is, the controller 150 checks traffic information of each road section up to the destination from the location to which the vehicle 20 has been moved, and adds values obtained by multiplying weight values of respective corresponding links to the corresponding link distances with respect to all links. Then, the controller 150 selects a route in which the calculated total value is the minimum as an optimum route.

With reference to FIG. 21, the vehicle 20 passes through a current road section, and when a new road section appears, namely, when the next junction 720 appears, the controller 150 determines that the event for requesting researching of the travel route has occurred. In this instance, when the currently traveling road section is not a final link, the controller 150 repeatedly performs the steps S630 and S651 to S657 to calculate the optimum route with respect to the remaining road sections, changes the route according to the calculated route, and performs the navigation guidance.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of selecting a travel route, the method comprising:
   receiving message information, the message information comprising location information including link identifiers assigned to road sections, and traffic information including current traffic status information and predicted traffic status information, the current traffic status information comprising at least one of an average speed, a travel time and a congestion type for each road section, the predicted traffic status information comprising at least one of a predicted speed, a predicted travel time and congestion tendency information;
   obtaining a weight value for each road section based on the congestion type and the congestion tendency information for a corresponding road section;
   receiving first and second location values for searching a travel route;
   calculating travel prediction information of the entire road sections from a first position to a second position by applying each weight value for each road section from the first position to the second position; and
   selecting an optimum route according to the travel prediction information calculated for each possible route from the first position to the second position.

2. The method of claim 1, wherein when an event requiring re-searching of a route occurs while a vehicle is traveling along the optimum route, travel prediction information of the entire road sections from the point at which the event occurs to the second position is re-calculated.

3. The method of claim 2, wherein the event requiring the re-searching of a route corresponds that the vehicle enters a new road section or message information comprising new traffic information is received.

4. The method of claim 3, wherein when the new road section is a final road section to the destination, travel guidance is performed according to the previous optimum route without travel prediction information being re-calculated.

5. The method of claim 1, wherein, in selecting the optimum route, a travel route whose calculated travel prediction information, among the possible routes, has the minimum or maximum value is selected as the optimum route.

6. The method of claim 5, wherein when there are several routes whose travel prediction information has the minimum or maximum value, a route that has relatively long road sections whose congestion tendency are reduced is selected as the optimum route.

7. The method of claim 1, wherein the first position is a current location or a start point.

8. The method of claim 1, wherein the second position is a destination or an intermediate point.

9. The method of claim 1, wherein the travel prediction information is calculated by multiplying each weight value for each road section by a distance of each corresponding road section, and the resultant values of the entire road sections between the first position and second position are added up.

10. The method of claim 1, wherein the message information is a TPEG (Transport Protocol Expert Group) message, and the current traffic status information and the predicted traffic status information are included in a CTT (Congestion and Travel-Time information) event container of the TPEG message.

11. An apparatus for selecting a travel route comprising:
   a receiving device configured to receive message information, the message information comprising location information including link identifiers assigned to road sections, and traffic information including current status information and predicted traffic status information, the current traffic status information comprising at least one of an average speed, a travel time and a congestion type for each road section, the predicted traffic status information comprising at least one of a predicted speed, a predicted travel time and congestion tendency information;
   the receiving device further configured to obtain a weight value for each road section based on the congestion type and the congestion tendency information for a corresponding road section;
   an input configured to receive first and second location values for searching a travel route; and
   a processing device configured to calculate travel prediction information of the entire road sections from a first position to a second position by applying each weight value for each road section from the first position to the second position and to select an optimum route according to the travel prediction information calculated for each possible route from the first position to the second position.

12. The apparatus of claim 11, wherein, when an event requiring re-searching of a route occurs while a vehicle is traveling along the optimum route, the processing device is configured to re-calculate travel prediction information of entire road sections from the point at which the event occurs to the second position.

13. The apparatus of claim 12, wherein the processing device is configured to determine that the event requiring the re-searching of a route occurred if the vehicle enters a new road section or message information including new traffic information is received.

14. The apparatus of claim 13, wherein, when the new road section is a final road section to the destination, the processing device is configured to determine that the event requiring the re-searching of a route did not occur and to perform travel guidance according to the previous optimum route without re-calculating the travel prediction information.

15. The apparatus of claim 11, wherein the processing device is configured to select a travel route whose calculated travel prediction information, among the possible routes, has the minimum or maximum value, as the optimum route.

16. The apparatus of claim 15, wherein, when there are several routes whose travel prediction information has the minimum or maximum value, the processing device is configured to select a route that has relatively long road sections whose congestion tendency are reduced as the optimum route.

17. The apparatus of claim 11, wherein the first position is a current location or a start point.

18. The apparatus of claim 11, wherein the second position is a destination or an intermediate point.

19. The apparatus of claim 11, wherein the processing device is configured to calculate the travel prediction information by multiplying each weight value for each road section by the distance of each corresponding road section, and the resultant values between the first position and second position are added up.

20. The apparatus of claim 11, wherein the message information is a TPEG (Transport Protocol Expert Group) message, and the current traffic status information and the predicted traffic status information are included in a CTT (Congestion and Travel-Time information) event container of the TPEG message.

21. The method of claim 1, wherein the congestion type comprises smooth, slow speed, delay and congestion, the congestion tendency information comprises a case where an average link speed is maintained, a case where the average link speed is increased and a case where the average link speed is decreased, and each different weight value is assigned to each combination of the congestion type and the congestion tendency information.

22. The apparatus of claim 11, wherein the congestion type comprises smooth, slow speed, delay and congestion, the congestion tendency information comprises a case where an average link speed is maintained, a case where the average link speed is increased and a case where the average link speed is decreased, and each different weight value is assigned to each combination of the congestion type and the congestion tendency information.

* * * * *